United States Patent [19]

Kovacs

[11] 4,379,227
[45] Apr. 5, 1983

[54] APPARATUS FOR AND A METHOD OF MONITORING THE BUILD-UP OF ICE

[76] Inventor: Paul Kovacs, Obere Bühlstrasse 13, CH-8700 Küsnacht, Switzerland

[21] Appl. No.: 255,096

[22] Filed: Apr. 17, 1981

[30] Foreign Application Priority Data

Apr. 21, 1980 [EP] European Pat. Off. ............ 80200360

[51] Int. Cl.³ .............................................. G01W 1/00
[52] U.S. Cl. .................................. 250/231 R; 340/583
[58] Field of Search ........................... 250/231 R, 341; 340/580, 583, 581, 582

[56] References Cited

U.S. PATENT DOCUMENTS 4,327,286  4/1982  Thoma ............................ 250/231 R Primary Examiner—David C. Nelms
Assistant Examiner—Darwin R. Hostetter
Attorney, Agent, or Firm—Lane, Aitken, Kice & Kananen

[57] ABSTRACT

An apparatus for monitoring the build-up of ice on engine and plant parts encompasses a monitoring surface area and a reference surface area located on a part of such engine. There is provided a first means which heats the reference surface area to a temperature above the freezing point. A second means illuminates the reference surface area as well as the monitoring surface area. The light reflected from both these areas is led to a light receiver which emits signals which are applied to a fourth means. This fourth means determines the difference between the output signals of the light receiver and generates accordingly a control signal. This apparatus allows a safe detection of ice build-up independent from a soiling of the monitoring and/or reference surface areas.

12 Claims, 4 Drawing Figures

APPARATUS FOR AND A METHOD OF MONITORING THE BUILD-UP OF ICE

BACKGROUND OF THE INVENTION

1. Field of the Invention

The present invention relates to an apparatus for and a method of monitoring the build-up of ice on engine and plant parts. It is generally known that the build-up of ice on the surface of exposed engine and plant parts must be monitored to avoid damages resulting from this ice build-up by an early detection of same. A build-up of ice at the intake of the axial compressor of gas turbines or aircraft jet engines which may be produced, for instance, due to changes of the temperature or—at low temperatures—due to a change of the humidity of the air is specifically dangerous because the forming of ice changes the blade profile which leads to a discontinuity of the air- or gas flow, respectively, as well as of the pressure along the axial extent of the compressor which may lead to a reduced infeed of air or even to a total failing of infed air. Such condition results in the already compressed air present in the engine parts behind the compressor to stream suddenly back towards the compressor intake whereby pressure waves or compressional waves, respectively, are generated, which, as is generally known, can lead to a destruction of the blades.

2. Description of the Prior Art

A known apparatus for monitoring the build-up of ice comprises a plug projecting radially into the intake of a compressor, which plug is made to oscillate by an electric means whereby the frequency of the oscillation of this plug changes in accordance with deposits on its surface, which deposits may, for instance, be ice. This change of the frequency is used as measured value regarding the detection of deposits on this plug or on the engine parts and plant parts, respectively, adjacent to this plug.

This monitoring apparatus or device, respectively, features, however, the drawback that it can be used only if the ambient air is clean, i.e. it can be used, for instance, only for aircraft jet engines operating at great heights. If such monitoring apparatuses are used at the ground surface in areas of highly contaminated air such, for instance, in gas turbines installed in power plants, the deposits of such contaminants on the plug change its frequency of vibration or oscillation, respectively, such that erroneous monitoring signals are produced.

SUMMARY OF THE INVENTION

Hence, it is a general object of the present invention to provide an improved apparatus for and a method of monitoring the build-up of ice on engine and plant parts, which apparatus and method will not be influenced by contaminations.

Another object of this invention aims at the provision of a new and improved construction of an apparatus for monitoring the build-up of ice on engine and plant parts which is extremely simple in construction and design, reliable in operation, economical to manufacture, and dependable in use.

Now, in order to implement these and still further objects of the invention, which will become more readily apparent as the description proceeds, the apparatus for monitoring the build-up of ice on engine and plant parts of this development is manifested by the features of comprising a first means for heating of a reference surface at the engine or plant part to a temperature above the freezing point; at least one second means for illuminating said reference surface and a remotely thereof located monitoring surface at said engine or plant part; at least one third means for measuring the intensity of the light reflected from said reference surface and said monitoring surface; and at least one fourth means for determining the difference between the values measured by said at least one third means and for the generation of a corresponding output signal. Preferably there are provided fiber optical means for feeding the light reflected from said reference surface and said monitoring surface to said third means.

Above measures allow now to safely detect a build-up of ice independently from a soiling or contamination of surfaces because a formation of white ice crystals on the monitoring surface, i.e. the surface being monitored, leads to a sudden change of the optical reflection independent from the surface quality of the monitoring surface as well as the reference surface. This leads in any case to a unilateral measuring of the difference between the optical reflections of the monitoring surface area and of the optical reflection from the reference surface area heated above freezing point. A further advantage is also, however, that the optical measuring procedure cannot be influenced by vibrations of an engine, of a machine or of a plant. Additionally, it is possible to separate by the use of optical fibers the measuring range or area, respectively, at the engine or plant spacially from the measuring- and evaluation devices of the monitoring apparatus.

The apparatus in accordance with the invention allows a monitoring of the build-up of ice in a wide range of application, for instance, a monitoring at aircraft jet engines, industrial- and power plant gas turbines, compressors and blowers, air filters, air intake pipes for e.g. internal combustion engines, in the general area of chemical processes and similar.

BRIEF DESCRIPTION OF THE DRAWINGS

The present invention will be more fully understood by reference to the following detailed description thereof, when read in conjunction with the attached drawings, and wherein.

DETAILED DESCRIPTION OF A PREFERRED EMBODIMENT

Figure 1:
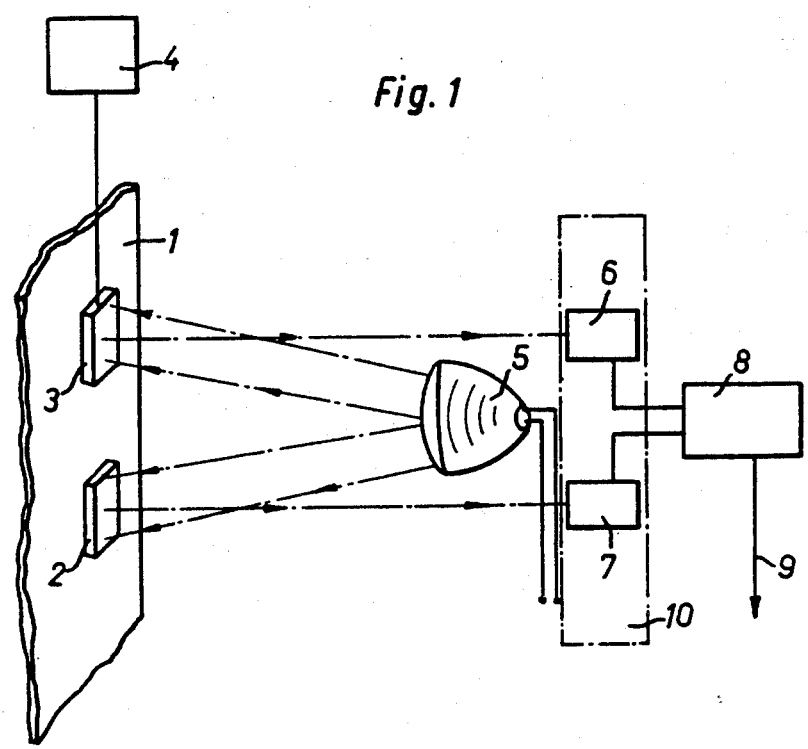
FIG. 1 is a schematic view of the principles of the structure and function of the inventive monitoring apparatus.

Referring now to the drawings and considering initially the exemplary embodiment of an apparatus for monitoring the build-up of ice on an engine or plant part 1, it will be understood that same comprises a monitoring surface 2 and a reference surface 3 which is arranged at a location remote from the monitoring surface 2, which surfaces themselves may be surface areas of the corresponding machine or plant, respectively, themselves or may be such as shown with regard to pat 1 of the drawing little plates applied thereto.

A first means 4 functions to heat the reference surface 3 to a temperature above the freezing point of water, i.e. the ice point. This first means 4 comprises preferably an electrical resistance heater or in a further embodiment can produce a heating of the reference surface 3 by means of intermittent infrared or laser light waves. The first means 4 may comprise further a device which produces and/or applies a stream of hot air onto the reference surface 3.

Furthermore, there is shown a second means 5 for illuminating of the reference surface 3 as well as the monitoring surface 2. This means 5 emits preferably pulsating light in order to avoid possible changes of the temperature, specifically at the monitoring surface 2 which may be produced when using a continuous illumination thereof. This second means 5 may accordingly be an intermitting light source in form of a discharge lamp.

The monitoring apparatus comprises further a third means 10 embodied here in form of two light receivers 6 and 7 which measure the intensity of the light reflected from the reference surface 3 and from the monitoring surface 2.

These two light receivers 6 and 7, which may be embodied as photocells, feed their output signal to a fourth means 8, which determines the difference between the emitted signals of the light receivers 6 and 7 and generates an output signal 9 corresponding to this difference and serving as indicating signal. This analyzer 8 is preferably an electronic circuit having a not particularly shown threshold switch which produces an output signal 9 only in such case in which the difference between the intensity measured by the photocells 6 and 7, respectively, of the light reflected from the reference surface 3 and monitoring surface 2, respectively, exceed a predetermined, adjustable value or figure.

The above principles of the inventive apparatus and also method can be embodied further structurally in various ways.

Figure 2:
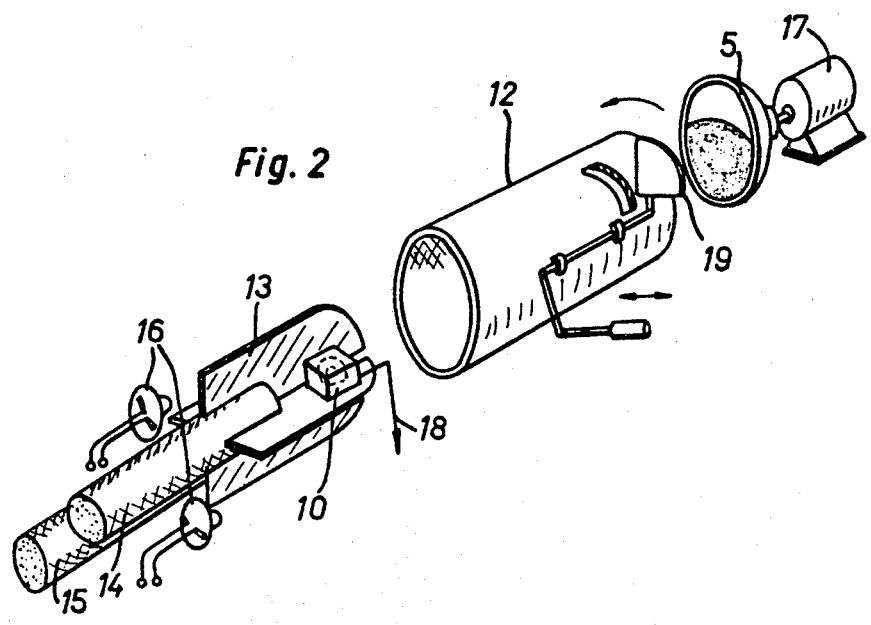
FIG. 2 is a perspective view of a construction of a light emitter and of a light receiver of the monitoring apparatus shown in FIG. 1.

Reference is made now to FIG. 2. The light source 5 and the light receiver device 10 of this structural arrangement, which light receiver 10 comprises only one photocell are combined in one unit and encased by a casing 12. This tube- or sleevelike, respectively, casing 12 encloses hereby a partition 13 in form of a cross seen in cross section, which partition 13 divides the casing 12 into four chambers extending seen in axial direction of the casing 12 parallel to each other. The ends of two optical fibers 14 and 15 extend into two chambers arranged axially opposite to each other, whereby the free ends of the optical fibers 14 and 15 end in a not particularly shown arrangement closely adjacent the reference surface and monitoring surface, respectively, thus may be located quite remotely from the evaluating or analyzing, respectively, devices independent of the prevailing length of these optical fibers. In the other two chambers it is possible to mount lamps 16, which may serve for checking the apparatus and the function thereof as will be described later on.

Close to the inner ends of the optical fibers 14 and 15 the casing 12 is closed off by a light source 5 which in the shown embodiment comprises a parabolic mirror, whereby one-half of this mirror is covered by a layer of a nonreflecting material, which parabolic mirror is rotated by a motor 17.

Mentioned light receiver 10 is thereby arranged at the focal point of the parabolic mirror 5.

This rotating parabolic mirror guides the light reflected from the monitoring surface and from the reference surface and guided and fed by the optical fibers 14 and 15 towards the light receiver 10. The impulse-like output signal 18 of this light receiver 10 is fed to the previously described evaluating apparatus.

In order to check the function of the apparatus above mentioned lamps 16 can be alternatingly switched on such to imitate the reflections of the optical fibers in place of these fibers. For a further checking it is possible to alternatingly close off the exits of the optical fibers 14 and 15 by the agency of a flap or plate, respectively, 19, which is pivotably mounted at the casing 12.

Figure 3:
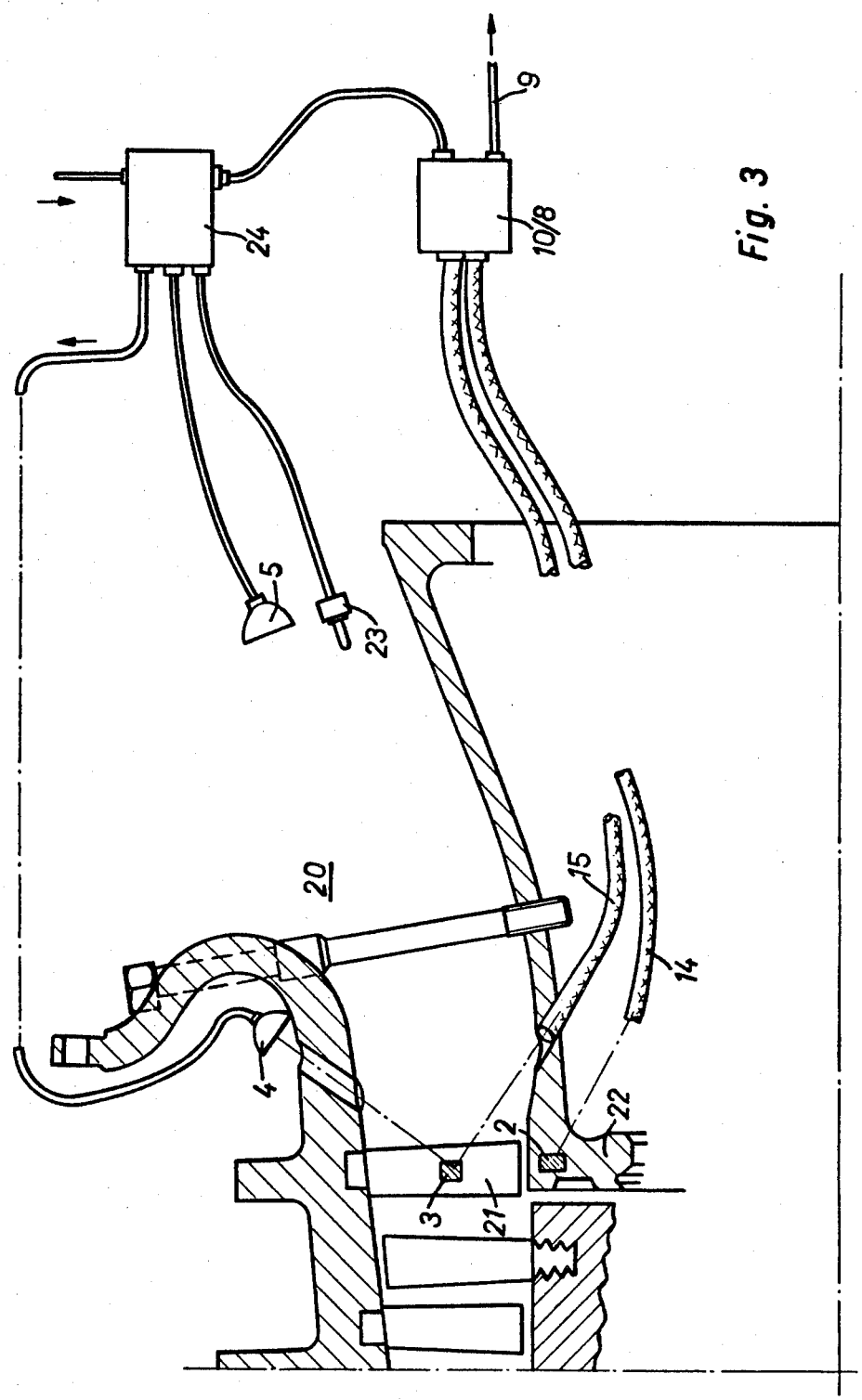
FIG. 3 is a schematic view of an application of the monitoring apparatus shown in FIG. 1 at the guide vanes of an axial compressor.

A first practical application of the above described monitoring apparatus is shown in FIG. 3 as arranged at the blades or vanes, respectively, of the first guide vane row of a compressor, of which a part is shown in FIG. 3 and indicated by the reference numeral 20. With this arrangement the reference surface 3 on a guide vane or blade, respectively, 21 is heated by the heating device whereby in this case this heating device is a heat ray emitter. The monitoring surface 2 is arranged at an angular distance and on a further guide vane 22. Both surfaces 2 and 3 are mutually exposed to light rays of an intermitting light source 5 and the light reflections from these two surfaces 2 and 3 are each separately taken up by an optical fiber 14 and 15 and accordingly led to the measuring- and evaluating device 10, 8 as mentioned above, which produces then mentioned output signal 9.

The shown arrangement comprises, furthermore, an air temperature feeler 23 setting the switch-on or switch-off, respectively, point for the apparatus by the agency of an automatic control apparatus 24 operatively connected to all elements of the monitoring apparatus.

Figure 4:
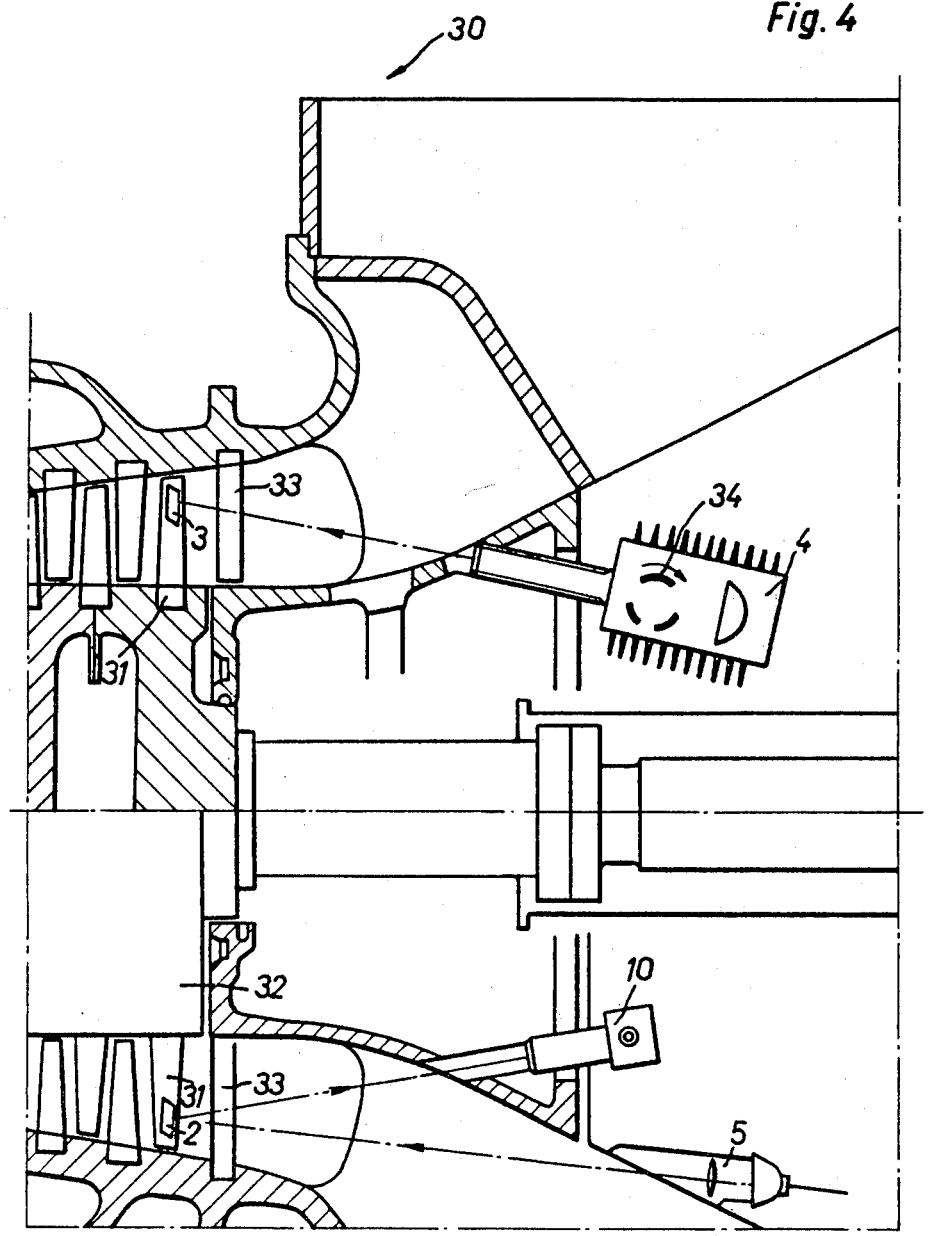
FIG. 4 is a schematic view of a further application of the monitoring apparatus shown in FIG. 1 at the rotor blades of an axial compressor.

A further application of the invention monitoring apparatus for monitoring the build-up of ice on the blades 31 of the first compressor wheel 32 of a compressor 30 is shown in FIG. 4. These blades 31 belong to the rotor blades of the compressor. This application makes use of a plurality of monitoring surfaces 2 and reference surfaces 3, which surfaces 2 and 3, respectively, are arranged on the blades 31 of the first blade row of the compressor. The heating device 4 and the light source 5 together with the corresponding light receiver 10 are aimed at a suitable area between two adjoining blades 33 of the first stationary guide vane row in the intake of the compressor. The heating device 4 is provided with an interrupting device constructed in the shown embodiment as a rotating orifice 34 which rotates synchronously to the rotation of the compressor rotor. This prevents a heating of all blades of the compressor wheel. In this embodiment all rotating blades of the compressor are illuminated by the light source 5 whereby only one light receiver 10 for receiving the reflected light is arranged.

According to a first embodiment of this application the rotating orifice produces a heating of every second rotor blade of this first stage of the compressor. If upon a build-up of ice the reflection from the monitoring surface 2 begins to differ distinctly from the reflection of the reference surface 3, impulse signals appear at the outlet of the light receiver which may feature, for instance, for a compressor wheel having 50 blades and operating at 3000 rpm a frequency of 2.5 kHz.

According to a further embodiment the orifice is adjusted such that alternatingly a first group of adjoining blades of the compressor wheel are heated and a thereafter passing group of blades is not heated. This allows the summarizing of the amplitude of the signal impulses belonging to the one group of blades and to considerably improve the sensitiveness and the reliability of the monitoring apparatus. Preferably the blade groups correspond to a sector angle of $$\left(\frac{360}{n}\right)^\circ,$$

whereby n is an even number larger than 2. This allows to avoid an unbalance of the compressor wheel and thus compressor rotor due to a heating of single blade groups.

The above described apparatus can be obviously modified in several ways. It is, for instance, possible to heat the monitoring surface or the monitoring surfaces of means of hot air. To this end a through bore would be simply provided in the mounting for the blades of the first guide vanes, which through bore corresponds to the bore for the light of the optical heating device 4 shown in FIG. 3, through which bore hot air bled at the exit of the compressor flows towards the blades. When applying a hot air heating for the application shown in FIG. 4, it is possible to do away with an interrupter device if every blade comprises a monitoring as well as a reference surface at varying distances from the blade root whereby a light receiver each is arranged for every of these surfaces.

While there are shown and described present preferred embodiments of the invention, it is to be distinctly understood that the invention is not limited thereto, but may be otherwise variously embodied and practiced within the scope of the following claims. ACCORDINGLY,

What is claimed is:

1. An apparatus for monitoring the build-up of ice on engine and plant parts, comprising
   a first means for heating of a reference surface at the engine or plant part to a temperature above the freezing point;
   at least one second means for illuminating said reference surface and a remotely thereof located monitoring surface at said engine or plant part;
   at least one third means for measuring the intensity of the light reflected from said reference surface and said monitoring surface; and
   at least one fourth means for determining the difference between the values measured by said at least one third means and for the generation of a corresponding output signal.

2. The apparatus as defined in claim 1, wherein said fourth means comprises an electronic circuit which generates an output signal as soon as the difference of the measured intensity between the light reflected from said reference surface and the light reflected from said monitoring surface exceeds a predetermined adjustable value.

3. The apparatus as defined in claim 1, wherein there are provided fiber optical means for feeding the light reflected from said reference surface and said monitoring surface to said third means.

4. The apparatus as defined in claim 1, wherein said third means comprises a first photocell for receiving of the light reflected by said reference surface and comprises further a second photocell for receiving of the light reflected by said monitoring surface.

5. The apparatus as defined in claim 1, wherein said third means comprises a light receiver for sequentially receiving the light reflected by said monitoring surface as well as by said reference surface, whereby said fourth means connected to the outlet side of said third means generates an output signal if the difference between said sequential signals generated by said light receiver exceeds a predetermined adjustable value.

6. A method of monitoring the build-up of ice on blades located in the intake of an axial compressor, comprising, providing
   a first means for heating of a reference surface at said compressor to a temperature above freezing point;
   at least one second means for illuminating said reference surface and a remotely thereof located monitoring surface at said compressor;
   at least one third means for measuring the intensity of the light reflected from said reference surface and from said monitoring surface;
   at least one fourth means for determining the difference between the values measured by said at least one third means and for the generation of a corresponding output signal;
   whereby said second means illuminates said reference surface which is arranged on a first blade and illuminates said monitoring surface which is arranged on a second blade, and whereby said third means comprises a light receiver assigned to said reference surface and a light receiver assigned to said monitoring surface.

7. The method of claim 6, wherein said first and said second blades are guide blades of said axial compressor.

8. The method of claim 6, wherein said blades belong to the first stage of said compressor, comprising a placing of said first means for a heating of a first area between two adjoining guide vanes of a guide vane ring in the intake of said compressor; directing said second means at a second area between two further adjoining guide vanes of said guide vane ring; providing a means which interrupt periodically and synchronously to the speed of rotation of the compressor wheel the influence of said second means such to achieve an alternating heating of several groups of adjoining blades passing through said second area; whereby all groups comprise the same number of blades such to avoid an unbalance and each group corresponds to a sector angle of $$\left(\frac{360}{n}\right)^\circ,$$

whereby n is an even number larger than 2; and whereby said third means comprises a light receiver to receive the light reflected by all said blades.

9. The method of claim 8, wherein said first means comprises a source of heat rays, and wherein said means which periodically interrupt the influence of said second means comprise a rotating orifice.

10. An apparatus for monitoring the build-up of ice on the guide vanes in the intake of an axial compressor, comprising:
    a first means for heating a reference surface on a guide vane to a temperature above the freezing point;

a second means for illuminating said reference surface and for illuminating further a monitoring surface on a further guide vane;

a third means for measuring the intensity of the light reflected from said reference surface and from said monitoring surface having a light receiver assigned to said reference surface and a further light receiver assigned to said monitoring surface; and at least one fourth means for determining the difference between the intensity of the light measured by said light receivers of said third means and for generating a corresponding output signal.

11. An apparatus for monitoring the build-up of ice on the blades of the first stage of an axial compressor, comprising:

a first means for heating a reference area located between two adjacent guide vanes of a guide vane ring at the intake of said axial compressor;

a second means for illuminating said reference area and for illuminating further a monitoring area located between two further adjacent guide vanes of the same guide vane ring;

a third means for measuring the intensity of light reflected from said reference area and from said monitoring area having a light receiver assigned to said reference area and a further light receiver assigned to said monitoring area;

at least one fourth means for determining the difference between the intensity of the light measured by said light receivers of said third means and for generating a corresponding output signal; and an interrupting means to interrupt periodically and synchronously to the speed of rotation of the compressor wheel the influence of said second means such to achieve an alternating heating of several groups of adjoining blades passing through said monitoring area; whereby all groups comprise the same number of blades such to avoid an unbalance and each group corresponds to a sector angle of $$\left(\frac{360}{n}\right)^\circ,$$

whereby n is an even number larger than 2.

12. The apparatus as defined in claim 11, wherein said first means comprises a source emitting heat rays, and wherein said interrupting means comprise a rotating orifice.

* * * * *